United States Patent [19]
Capek et al.

[11] Patent Number: 5,216,968
[45] Date of Patent: Jun. 8, 1993

[54] METHOD OF STABILIZING A COMBUSTION PROCESS

[75] Inventors: Karel Capek, Bergisch-Gladbach; Holger Kirchmann, Leichlingen; Martin Schweitzer, Odenthal; Winfried Vaulont, Cologne, all of Fed. Rep. of Germany

[73] Assignee: Bayer Aktiengesellschaft, Leverkusen, Fed. Rep. of Germany

[21] Appl. No.: 775,668

[22] Filed: Oct. 11, 1991

[30] Foreign Application Priority Data

Nov. 9, 1990 [DE] Fed. Rep. of Germany ....... 4035604

[51] Int. Cl.$^5$ .............................................. F23G 5/00
[52] U.S. Cl. ................................... 110/346; 110/238; 431/5; 431/8; 431/215
[58] Field of Search ............... 431/8, 215, 5; 110/238, 110/346

[56] References Cited

U.S. PATENT DOCUMENTS

| | | | |
|---|---|---|---|
| 4,094,625 | 6/1978 | Wang et al. | 110/238 X |
| 4,338,870 | 7/1982 | Lanier | 110/346 |
| 4,785,748 | 11/1988 | Sujata et al. | 110/238 |
| 4,915,038 | 4/1990 | Sujata et al. | 110/346 |
| 5,129,335 | 7/1992 | Lauwers | 431/215 X |

FOREIGN PATENT DOCUMENTS

| | | |
|---|---|---|
| 3004186 | 8/1980 | Fed. Rep. of Germany . |
| 3446788 | 7/1986 | Fed. Rep. of Germany . |
| 3828248 | 2/1990 | Fed. Rep. of Germany . |

Primary Examiner—Edward G. Favors
Attorney, Agent, or Firm—Sprung Horn Kramer & Woods

[57] ABSTRACT

In a combustion process, liquid or gaseous residues having little or no calorific value are supplied to a flame in the main combustion chamber in addition to the fuel gas and the air for combustion. Stabilization of the flame and hence a reduction in the emission of nitrogen oxides is achieved by preheating the fuel gas and introducing it into the main combustion chamber at a temperature above its ignition temperature.

8 Claims, 2 Drawing Sheets

METHOD OF STABILIZING A COMBUSTION PROCESS

BACKGROUND OF THE INVENTION

This invention is based on a method of stabilizing a combustion process in which gaseous or liquid residues having little or no calorific value are supplied to a flame in a main combustion chamber in addition to the fuel gas and the air for combustion.

By "gaseous or liquid residues" are meant in this context gaseous or liquid waste materials which are required to be disposed of by combustion. The disposal of residues containing nitrogen entails the problem of nitrogen oxide emissions ($NO_x$ emission), as is well known.

When pressure changes occur in the combustion chamber of a burner as well as rapid changes in load, the flame in many cases breaks off for a short period until it is reignited by means of an accompanying ignition burner. The breaking off and reignition of the flame severely impairs the combustion process and results in an increased CO content and the formation of soot. When liquid waste materials are burned, this may be accompanied by brief smouldering processes which produce a high proportion of undesirable accompanying substances in the flue gas. The basis of all other measures for improving combustion is therefore in the first instance a burner flame which is stabilized under all operating conditions.

In the present state of the art, various methods are used for stabilizing burner flames, depending on the design of the burner and the purpose for which it is used. Baffles in the form of discs or so-called swirlers are frequently employed. Twist stabilized flames are also widely used (mainly for gaseous fuels); the ignition of these flames is maintained by hot flue gas which has been sucked back. A variation used for liquid fuel is based on a built-in solid body over which hot, reabsorbed flue gases flow. This solid body of the burner has the object of preparing the atomized fuel and carrying out a preliminary reaction with the aim of improving the maintenance of the flame and the completeness of combustion. A survey of the structural features and fields of application of industrial gas burners is given in the article by D. Mundus et al in Gas-Wärme-International, 37 (1988) 10, pages 509 to 514.

The difficulty of stabilizing a flame increases with decreasing calorific value of the fuel, with variations in load during the working up of waste fuels, e.g. of aqueous emulsions, and with variations in the quality of fuel. The resulting interfering factors and suitable countermeasures are described by B. Lenze et al in VDI-Berichte, 645, pages 269 to 297. It is generally known that a well-stabilized flame provides better combustion than a poorly stabilized flame. Lack of stabilization is generally recognised by an audible and visible pulsation of the flame. External means in the form of a constantly burning pilot flame are frequently used for stabilising liquid fuels which have a low calorific value and fuels with a highly fluctuating calorific value over a wide output range. The pilot flame, which is in many cases produced by a high output pilot burner, is itself extremely stable in its ignition. The ignition of, for example, an atomized low calorie fuel takes place in the part of the spray jet in which the hot jet of exhaust gas encounters the spray jet. As the hot but otherwise substantially inert gas jet of the pilot burner encounters the spray jet from the side, it promotes local evaporation of the droplets, and as the flow continues, the mixture of evaporated fuel with ordinary air as oxygen carrier is ignited if the temperature is sufficiently high, assuming that this mixture is capable of being ignited. The fact that the hot jet of exhaust gas is itself inert is a disadvantage if the fuel gas and air are supplied to the pilot burner in the stoichiometric ratio for obtaining maximum temperatures. Another disadvantage is that the spray jet, which is normally rotationally symmetrical, is ignited only in certain parts. If the substances to be burned are not readily combustible, ignition of the entire spray jet only occurs at a considerable distance further downstream. An oblique flame is then produced which continues to burn in a stable manner after ignition by the pilot flame so long as the liberation of heat in a control volume is sufficient for igniting one or more adjacent control volumes.

When the flame instabilities described above occur and especially when there are locally great turbulences in the flame, there is a risk of increased formation of nitrogen oxides with correspondingly higher emissions of $NO_x$.

SUMMARY OF THE INVENTION

It is therefore an object of the present invention to ensure increased stabilization of the flame under difficult operating conditions, which are, in particular:

Sharply fluctuating pressure in the combustion chamber due to fluctuations in load when burning gaseous or liquid waste materials;

the use of one or more gaseous and/or liquid fuels having a low or greatly varying calorific value;

disturbances due to temporary introduction of flame-inhibiting substances.

It is a further object of the invention to reduce the $NO_x$ emission.

The stabilization of the combustion process required for achieving these aims is realised according to the invention by preheating the fuel gas to such an extent that the gas enters the main combustion chamber at a temperature above its ignition temperature. The high stability of ignition is thus achieved by heating the fuel gas so intensively in a chamber (heating chamber) separate from the main combustion chamber that the thermal reaction takes place immediately after exit from the heating chamber, when mixing with the oxygen-containing gas takes place.

Heating up of the fuel gas advantageously takes place in direct contact with the flue gases of a burner situated in the heating chamber. The resulting mixture of fuel gas and flue gas is then supplied to the main combustion chamber as ignition gas. Alternatively, the fuel gas may be conducted through a heat exchanger connected with the heating chamber (indirect heating). The temperature of the preheated fuel gas or fuel gas/flue gas mixture (ignition gas) on entering the main combustion chamber should be at least 5% above the ignition temperature.

For disposal of liquid waste materials, the liquid residue is injected into the flame of the main combustion chamber and the ignition gas is introduced into the atomized liquid in the form of directed ignition jets. This introduction is advantageously carried out rotationally symmetrically from a concentric ring of openings so that the atomized liquid becomes concentrically enveloped by the gas jets.

When burning nitrogen-containing waste materials, the burner in the heating up chamber is advantageously operated under substoichiometric conditions so that the ignition gas contains carbon monoxide. The reduction of $NO_x$ is then due to the controlled production and distribution of CO as reducing agent and the heating up of the fuel gas to temperatures above the ignition point. One variation for reducing the $NO_x$ emission consists in that the fuel gas or the fuel gas/flue gas mixture is catalytically decomposed with liberation of hydrogen before its entry into the main combustion chamber so that hydrogen serves as reducing agent instead of CO. This may be achieved by, for example, lining the wall of the heating chamber with catalytically active substances such as platinum, carbon or metal oxides. Alternatively, the catalyst mounted on a suitable carrier may be brought into contact with the heated fuel gas.

According to a further development of the invention, a non-combustible regulating gas containing oxygen or free from oxygen is fed into the heating chamber. This regulating gas enables the quantity of combustion gas put through to be varied within wide limits and adapted to the particular requirements of the combustion process.

As a result of the measures according to the invention, a substantially compact, stably burning, homogeneous flame is produced in the main combustion chamber and the following advantages are achieved:

1. The injected spray jet of a liquid waste material is ignited over its entire surface. A greater amount of heat is thereby released.
2. Fuels having a low calorific value can be reliably ignited.
3. Ignition takes place at a relatively low temperature in the region of a relatively large ignition zone ("soft" ignition). The formation of temperature peaks and hence the production of $NO_x$ by thermal means is thereby to a large extent prevented.
4. The flue gas, which has an inhibiting effect, is introduced in only extremely small quantities into the ignition zone.
5. The hot ignition gas can be subdivided and directed to different regions of the atomized spray jet.
6. The hot ignition gas does not cool down in its path to the ignition zone since part of the transported heat is released at the periphery of the jets of ignition gas due to admixture with the surrounding air.
7. The jets of ignition gas are very stable due to the great temperature difference from their surroundings and therefore extend over a wide range.
8. A relatively great change in the energy input into the main combustion chamber can be brought about by a relatively slight change in the quantity of throughput.
9. If existing firing installations are suitably re-equipped, exhaust air containing $NO_x$ or liquid waste containing nitrogen can be disposed of without the secondary measures for $NO_x$ reduction normally required, and the concept according to the invention is also suitable for low output burners.

The invention will now be described in more detail with reference to drawings and examples of embodiments.

DETAILED DESCRIPTION OF THE INVENTION

Figure 1:
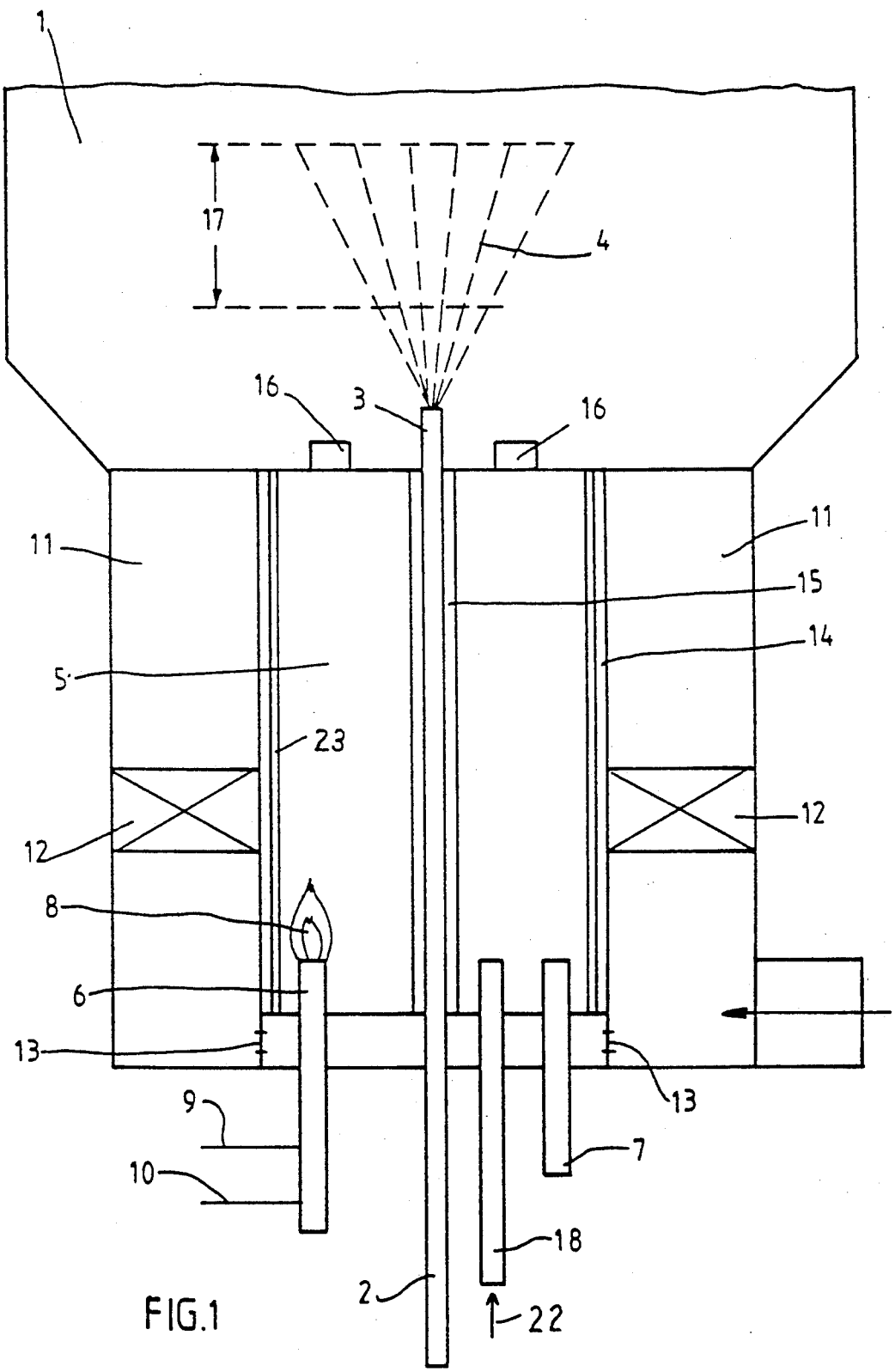
FIG. 1 shows a burner with direct preheating of the ignition gas.

In FIG. 1, an atomization lance 2 carrying a two-component nozzle 3 at its end is arranged in the axis of a main combustion chamber 1. A liquid residue is injected into the main combustion chamber 1 through the atomization lance 2 (spray cone 4). In front of the main combustion chamber 1 is a heating up chamber 5. Viewed from outside, a high output pilot burner 6 and a lance 7 for the supply of fuel gas (e.g. natural gas) extend into the heating chamber 5. Air 9 and fuel gas 10 are supplied separately to the pilot burner 6 with its flame 8. The air for combustion is supplied to the main combustion chamber 1 from an annular channel 11 arranged concentrically around the heating chamber 5. A twist is imparted to the air for combustion by the built-in twist generator 12. A small proportion of the air for combustion flows through bores 13 on the inner side of the annular channel 11 into an outer annular gap 14 between the heating chamber 5 and annular channel 11 and an inner annular gap 15 between the heating chamber 5 and the atomization lance 2. Outlet openings for the fuel gas/flue gas mixture formed in the heating chamber 5 are arranged at the upper end of the heating chamber 5, uniformly distributed over the circumference of a circle. This mixture will hereinafter be referred to as "ignition gas".

To take the novel burner into operation, regulating gas free from oxygen is first passed through the heating chamber 5 at about the same volumetric flow as the combustion gas which is to be heated. The pilot burner 6 is then ignited and the flue gases produced are introduced into the main combustion chamber 1 through the openings 16. Provided these flue gases are at a higher temperature at the outlet openings 16 than the ignition temperature of the fuel gas, the latter is supplied from the lance 7 and the regulating gas is withdrawn correspondingly. The flue gases produced by the flame 8 of the pilot burner 6 now mix with the fuel gas and, as already mentioned, produce an ignition gas, which flows into the main combustion chamber 1 through the openings 16. The output of the burner 6 is calculated to ensure that the ignition temperature of the ignition gas entering the main combustion chamber 1 will be at least 10% above its own ignition temperature. The ignition gas encounters the liquid spray jet 4 in the evaporation and ignition zone 17. Mixing and thermal reaction with the oxygen-containing air for combustion supplied through the annular channel 11 also take place in this zone. The atomized liquid residue evaporates and at the same time its combustible components ignite. The spray cone 4 of the atomized liquid becomes enveloped concentrically by the ignition jets leaving the openings 16 and by the jacket of flame produced in the ignition zone 17. A further improvement in the stabilization of the combustion process may be achieved by increasing the number of ignition jets and/or arranging for the ignition jets to emerge partly parallel to the axis and partly convergent and/or arranging for the ignition jets to have different diameters.

By operating the pilot burner 6 under substoichiometric conditions, the ignition gas can be arranged to contain definite proportions of CO. The formation of $NO_x$ in the ignition zone 17 is thereby minimized and the quantity of $NO_x$ is reduced so that the $NO_x$ emission rate of the burner can be drastically reduced by this measure alone.

A regulating gas containing or free from oxygen may in addition be supplied to the heating chamber 5 through the lance 18. If, for example, the calorific value of the atomized liquid residue decreases due to an increase in its water content, the higher rate of throughput of fuel gas then required can be maintained at the same temperature by supplying a small quantity of air into the heating chamber 5 through the lance 18. A release of heat corresponding to the amount of oxygen introduced with the air then takes place in the heating chamber 5 so that the ignition gas leaves the heating chamber 5 at a higher temperature. Conversely, if the outlet temperature of the ignition gas at the outlet openings 16 rises due to a reduced throughput of fuel gas, the rise in temperature may be quenched by the addition of nitrogen through the lance 18. Given a constant output of pilot burner 6, therefore, the rate of throughput of fuel gas can be varied within wide limits and adapted to the requirements of the combustion process in the main combustion chamber 1 by means of the regulating gas 22 supplied through the lance 18. The same considerations apply to the proportion of CO in the ignition gas leaving the heating chamber. The heating chamber 5 can be lined with catalytically active substances 23 such as platinum, carbon or metal oxides to catalytically decompose the mixture of flue gas and fuel gas with liberation of hydrogen before its entry into main combustion chamber 1.

Figure 2:
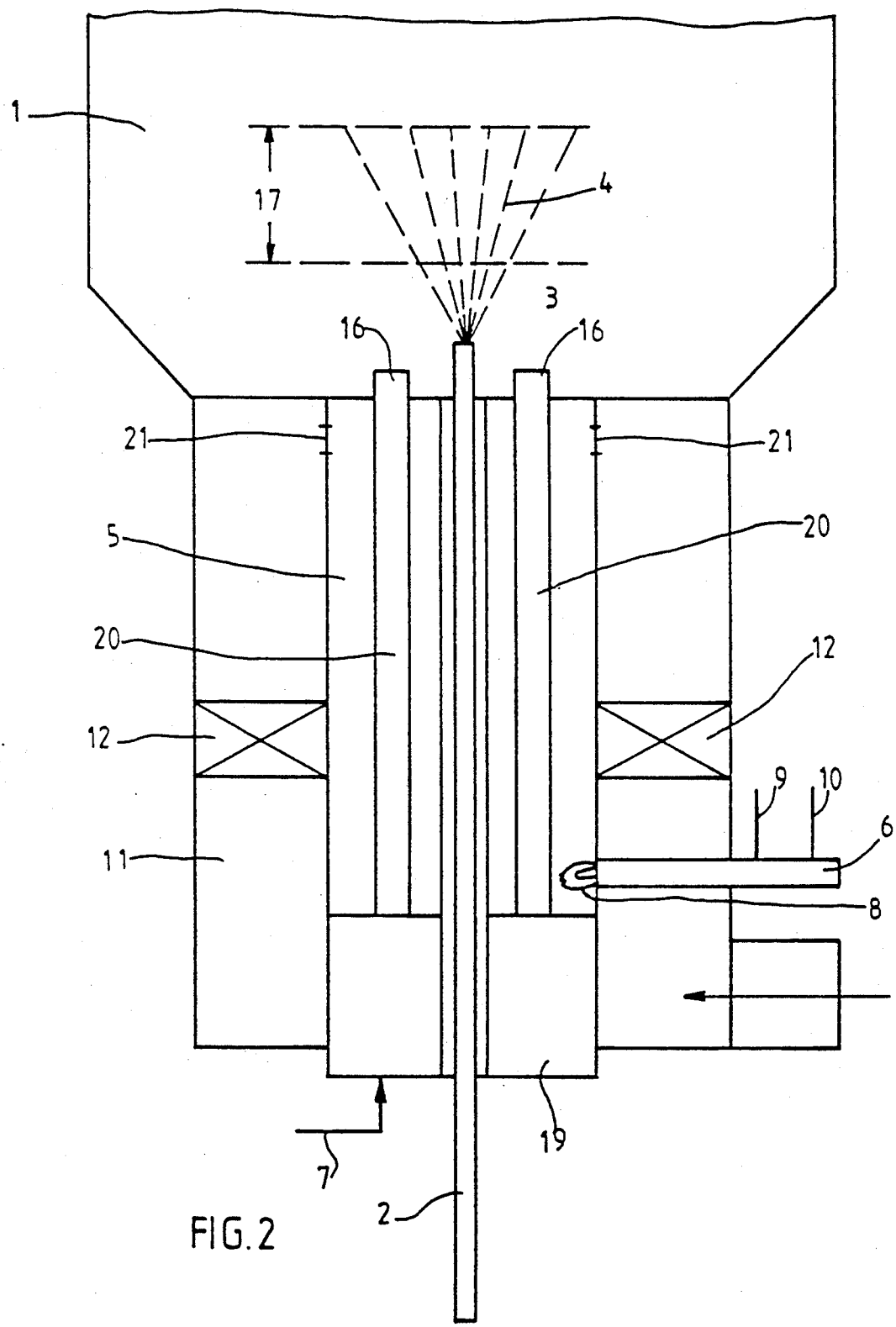
FIG. 2 shows a burner preceded by a heat exchanger for heating the ignition gas.

FIG. 2 illustrates a modified burner construction. In contrast to the burner of FIG. 1, the ignition gas is in this case not preheated in direct contact with the flue gases of a pilot burner 6 but indirectly by heat exchange in the heating chamber 5. The fuel gas which is to be heated in this case first enters a distributor chamber 19, then flows through the heating chamber 5 in individual pipes 20 and finally leaves through the outlet openings 16 to enter the main combustion chamber 1 in the same manner as described above. The pilot burner 6 in the heating chamber 5 is in this case mounted sideways. The flue gas of the laterally arranged pilot burner 6 flows radially into the twisted air for combustion through the openings 21 in the annular channel 11. The preheated fuel gas (natural gas) is thus not mixed with the flue gas of the pilot burner 6 in this embodiment. The heat for the heating up chamber 5 could in this case also be produced by other means, for example by an electric resistance heating. The burner is otherwise analogous in construction to the apparatus illustrated in FIG. 1.

EXAMPLE OF PRACTICAL APPLICATION

In the burner of FIG. 1, 800 l/h of water was atomized into the surrounding air by means of a two-component nozzle 3 with the aid of nitrogen. The atomization lance 2 having an external diameter of 55 mm projected from the annular heating chamber 5 by 150 mm. The heating chamber 5 had an external diameter of 230 mm and at its end facing the main combustion chamber 1 it was provided with six outlet openings 16 parallel to the axis and 14 mm in diameter on each of two partial circles 100 mm and 140 mm in diameter. A pilot burner 6 operated sub-stoichiometrically with $\lambda=0.7$ burned in the heating chamber 5 for directly heating up 25 m$^3$/h of natural gas as fuel gas. Ignition of the ignition gas leaving the outlet openings 16 at the rate of about 60 m/s was initiated on one occasion at 960° C. and on another occasion at 1020° C.

The intrinsic stability of the ignition jets leaving the heating up chamber 5 was maintained up to 100 degrees Centigrade below the ignition temperature of the natural gas of 670° C.

We claim:

1. A method of stabilizing a combustion process comprising the steps of: supplying a flame in a main combustion chamber with liquid or gaseous residues having little or no calorific value in addition to a fuel gas and air for combustion and preheating the fuel gas to enter the main combustion chamber at a temperature above its ignition temperature.

2. The method according to claim 1, wherein the step of preheating comprises heating the fuel gas in a heating chamber in direct contact with a burner arranged therein and the flue gases produced, and supplying the mixture of fuel gas and flue gas to the main combustion chamber as ignition gas.

3. The method according to claim 1, wherein the step of preheating comprises passing the fuel gas through a heat exchanger connected with a heating chamber.

4. The method according to claim 2, wherein liquid residues are injected into the flame of the main combustion chamber by a two-component nozzle and the fuel gas or mixture of fuel gas and flue gas is introduced into an atomization zone of the residue in the form of directed ignition jets.

5. The method according to claim 4, wherein atomized liquid is concentrically enveloped by the ignition jets.

6. The method according to claim 2, wherein the burner is operated substoichiometrically in the heating chamber so that the fuel gas or mixture of fuel gas and flue gas contains carbon monoxide.

7. The method according to claim 2, wherein the fuel gas or mixture of fuel gas and flue gas is catalytically decomposed with liberation of hydrogen before entry into the main combustion chamber.

8. The method according to claim 1, wherein a non-combustible regulating gas containing or free from oxygen is in addition introduced into the heating chamber.

* * * * *